United States Patent [19]

Corvelli

[11] 4,173,128
[45] Nov. 6, 1979

[54] COMPOSITE DRIVE SHAFT

[75] Inventor: Nicholas Corvelli, Smithtown, N.Y.

[73] Assignee: Grumman Aerospace Corporation, Bethpage, N.Y.

[21] Appl. No.: 908,742

[22] Filed: May 23, 1978

[51] Int. Cl.² .............................................. F16C 1/00
[52] U.S. Cl. ..................................... 64/1 S; 64/11 B; 64/1 V; 138/130
[58] Field of Search ....................... 64/1 S, 1 V, 11 B; 138/130, 118, DIG. 2, DIG. 7, 121, 122, 144

[56] References Cited

U.S. PATENT DOCUMENTS

| | | | |
|---|---|---|---|
| 2,747,616 | 5/1956 | DeGanahl | 138/130 |
| 2,969,812 | 1/1961 | DeGanahl | 138/130 |
| 3,500,869 | 3/1970 | Skoggard | 138/130 |
| 3,623,339 | 11/1971 | Muller | 64/11 B |
| 3,669,158 | 6/1972 | Phillips | 138/118 R |
| 3,691,000 | 9/1972 | Kalnin | 138/174 |
| 3,747,367 | 7/1973 | Muller | 64/11 B |
| 3,866,632 | 2/1975 | Schaffer | 138/130 |
| 3,921,674 | 11/1975 | Logan | 138/130 |
| 4,013,101 | 3/1977 | Logan | 138/130 |
| 4,089,190 | 5/1978 | Worgan | 64/1 S |

FOREIGN PATENT DOCUMENTS

| | | | |
|---|---|---|---|
| 2152289 | 4/1973 | France | 64/1 S |
| 1177921 | 1/1970 | United Kingdom | 64/11 B |

OTHER PUBLICATIONS

"Low-Cost High-Performance Carbon Fibers", Chambers, Mechanical Engineering, Dec. 1975, pp. 37-41.
"Advanced Fiber-Resin Composites," Berg, Machine Design, Apr. 1, 1971.

Primary Examiner—Charles J. Myhre
Assistant Examiner—R. C. Turner
Attorney, Agent, or Firm—Richard G. Geib; Mellor A. Gill

[57] ABSTRACT

A laminated drive shaft having integral universal provisions adjacent ends attached to driving and driven members joined by the shaft to transmit torque therebetween while permitting angular misalignment and displacement of these members.

14 Claims, 6 Drawing Figures

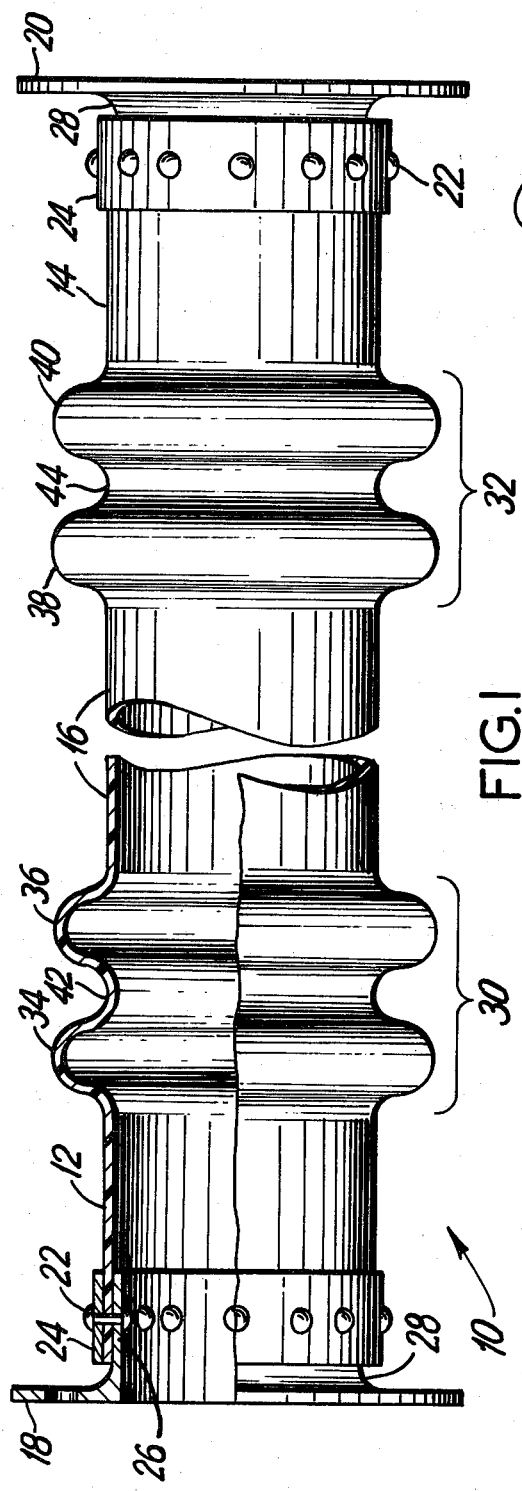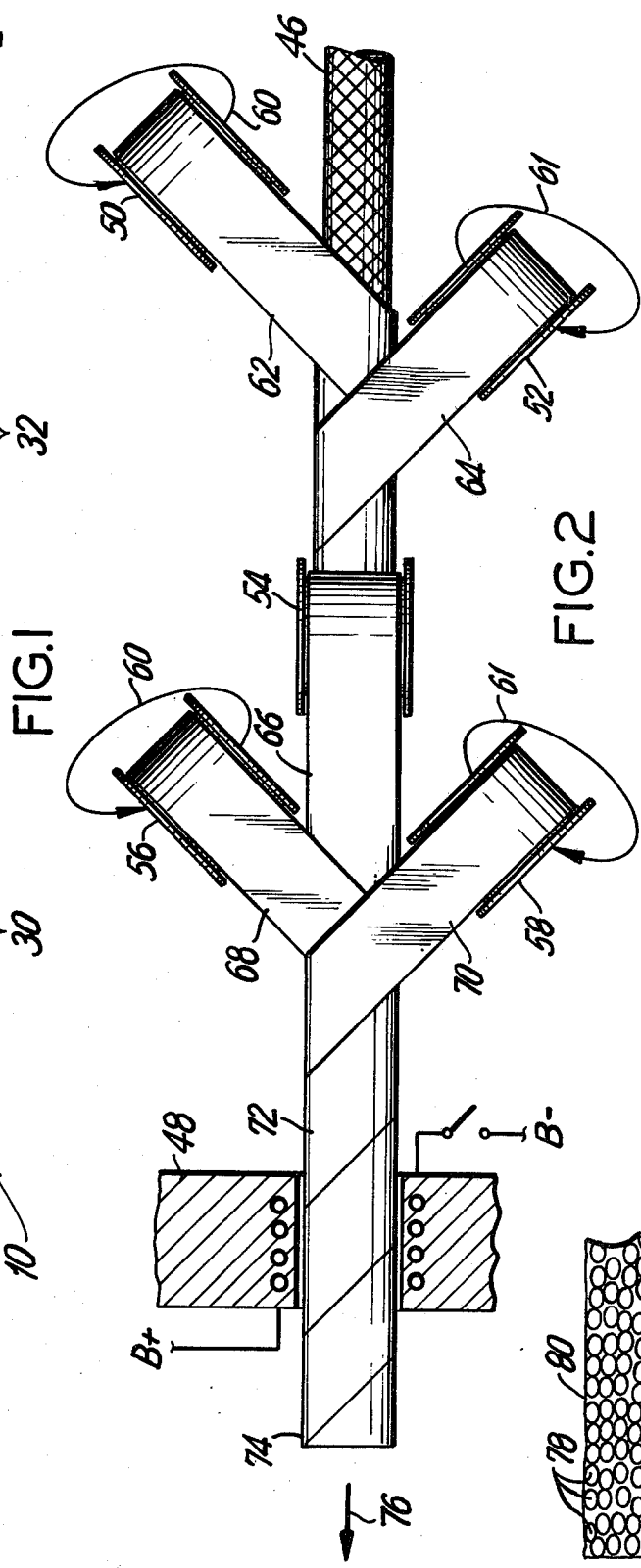

COMPOSITE DRIVE SHAFT

BACKGROUND

During the course of a novelty search conducted in the Office of Patents and Trademark files, U.S. Pat. Nos. 3,623,339; 3,678,707; 3,747,367; 3,753,625 and 3,745,411 were noted in the Examiner's files Class 64 subclass 11 B, plus one U.S. Pat. No. 3,232,076, in the search room files Class 403 subclass 50, all dealing with universals for drive shafts and the like that employed bellows type fittings for such.

In addition, in the Examiner's files Class 64 subclass 1 S, there were found U.S. Pat. No. 3,553,978 and two publications, "Advanced Fiber-Resin Composites", MACHINE DESIGN, Apr. 1, 1971, pp. 1-10, and "Boron and Carbon Fibre Drive Shafts", REINFORCED PLASTICS, February, 1975, p. 64, that show those skilled in the art have contemplated composite or laminated ply type construction for drive shafts, and in doing such, there is the expressed intent to provide such with end fittings that will allow the attachment of universals to the shaft. The well meaning intent is to allow such shafts to be used between known universal connections at the transmission and the driven member spaced therefrom to bring cost and weight savings without requiring extensive development and qualification of the critical universals. Fact of the matter is the intent was to provide a shaft that was stiffer than the metal shaft of today. Flexibility was not tolerated in the shaft length, but was to be provided by attachments thereto. As best summed up, these prior art attempts at composite shafting were to only provide, as stated by the objects of U.S. Pat. No. 3,553,978, column 1, lines 31 and 32, "a...shaft adapted to be mounted between universal joints..." and not to provide a shaft that itself in its own length had the universal's function.

FIELD OF THE INVENTION

This invention is therefore addressed to further improving the art in a hithertofore unobvious way so that the low cost and weight savings and strength improvements of composite technology may be further utilized in a drive train not only as a means to transmit torque but as a means to allow angular motion between elements of a drive train.

DRAWING DESCRIPTION

FIG. 1 is a broken plan view of a composite drive shaft according to this invention;

FIG. 2 is a plan view of a pultrusion (i.e., shaping by pulling through heated die means) fabricating process for the tubular form of the drive shaft of FIG. 1;

FIG. 2(a) is an enlarged end view of the tape used in the process of FIG. 2;

DETAILED DESCRIPTION

Figure 3:
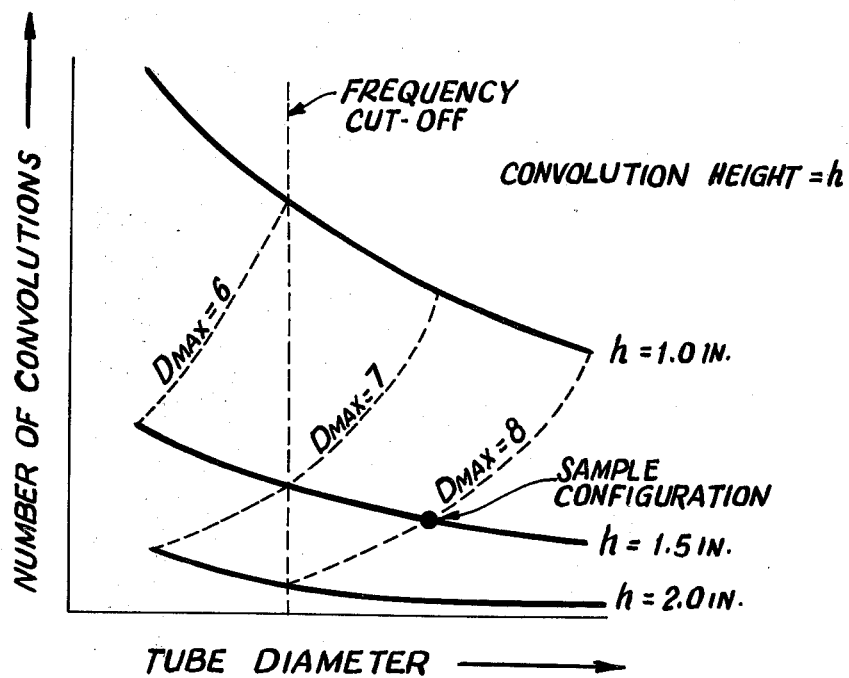
FIG. 3 is a graphical relationship of the specifications for the size and number of bellows required for proper universal response on various shafts.

With more particular reference now to FIG. 1, there is shown a composite drive shaft 10 having two ends 12 and 14 connected by a tube 16. End 12 is partially cross-sectioned so as to better show how the mating (connecting) fittings 18 and 20 are joined to ends 12 and 14 by means of rivets 22 through sleeves 24, ends 12 and 14, and annular flanges 26 and 28 of fittings 18 and 20.

Spaced inwardly of this end connection are bellows areas 30 and 32 for the respective ends 12 and 14. These bellows areas which provide the requisite flexibility for angular motion between drive train elements, may comprise one or more outward convolutions 34 and 36 or 38 and 40 with valleys 42 and 44 therebetween all equally contoured preferably so as to avoid stress concentration problems; i.e., a bellows surface curvature of gentle radius is sized to keep working stresses below fatique endurance limits.

This shaft is made of three distinct laminations of a filament reinforced organ matrix; e.g., epoxy of polyether sulfone, as will now be more particularly described starting with FIG. 2. A mandrel 46 is arranged adjacent a heated die 48 so as to have beam strength to support the rotational and axial motion in applying lamination plies thereto and pultrusion through the die to size the tube so formed. A plurality of tape reels such as shown (50, 52, 56 and 58) as required for the desired bias ply build-up for the laminate, are supported adjacent to the mandrel 46 prior to heated die 48. They are supported such that they are permitted to have rotational motion 60 and 61 in counterclockwise and clockwise orbit about 46 as the end 74 is pulled through the die 48. At the same time, this pultrusion unwinds tape 66 from reel 54 to form the intermediate lamination to be discussed next. The sequence of tape reels yields the desired laminate including a bias ply 62 with tape at a 45° angle to the mandrel axis and at a downstream station another bias ply 64 at an opposite 45° angle, for example, over the first bias ply.

As stated above, the pulling of the laminate through the heated die 48 not only forms the tube 76 but unwinds the underneath bias tapes 62, 64 and 76 and pulls the tape 66 off axially over the lamination of plies 62 and 64 to provide an axial layer thereover. Thereafter, in a similar fashion as with tapes 62 and 64, tapes 68 and 70 are wrapped as separate bias layers over the tubular axial layer of tape 66 to provide a wrapped tube 72 sized to the end 74 diameter by the pultrusion through die 48 in direction of arrow 76.

It should be noted that only for simplicity has the inner surface lamination of tapes 62, 64, the unidirectional intermediate lamination of tape 66 and outer surface lamination of tapes 68 and 70 been shown to comprise 2, 1 and 2 such reels. The actral number of reels required for each lamination can vary from this to any number as determined are needed to provide desired torsional qualitites and flexibilty requirements. Actually, in one model constructed so far for use as a 110 inch long truck drive shaft, it was found that 5 inch diameter tube required six (6) inner bias plies, three (3) at ±45° to longitudinal axis and three (3) at −45°, sixteen (16) axial plies; i.e., reinforcements being parallel or 0° to longitudinal axis, and, six (6) outer bias plies again at ±45° To longitudinal axis for a 0.0150 inch wall thickness as cured, to be discussed hereinafter. Such modeled construction used continuous graphite filaments 78 in a resin matrix 80 [see FIG. 2(a)]; i.e., a composite material consisting of 60% filaments and 40% matrix by volume. While an all graphite filament tape was used in the model, it is visualized that a hybrid laminate may be construed; i.e., bias plies using one type reinforcement, fiberglass, kevlar, and axial layers of another type reinforcement, kevlar or graphite, respectively. As one skilled in the art will recognize, the type of reinforcement and matrix will depend upon the design requirements for the shaft. It was found to meet the design requirements for a shaft that is to sustain an ultimate torque of 150,000 in./lbs. and permit an angular deflection of 6° at a maximum speed of 3,000 rpm. In this model, the laminate maximum shear stress was 25,000 psi and its maximum bending strain was 0.004 in./in.

FIG. 3 is a graphical representation of the results of a design study that determined the number of convolutions and size of this universal provisioning on a laminated shaft for the example cited. More particularly, the number of convolutions required to provide the needed flexibility are a function of the tube diameter and convolution height, h. Each point on this family of curves defines a satisfactory configuration as long as the diameter is equal to or greater than that required to minimize torsional vibrations (frequency cut-off). The sample configuration selected, which is a balanced design in terms of minimizing number of configurations, tube wall thickness and maximum diameter, is a 5 inch diameter tube with two (2) 1.5 inch high convolutions.

Figure 4:
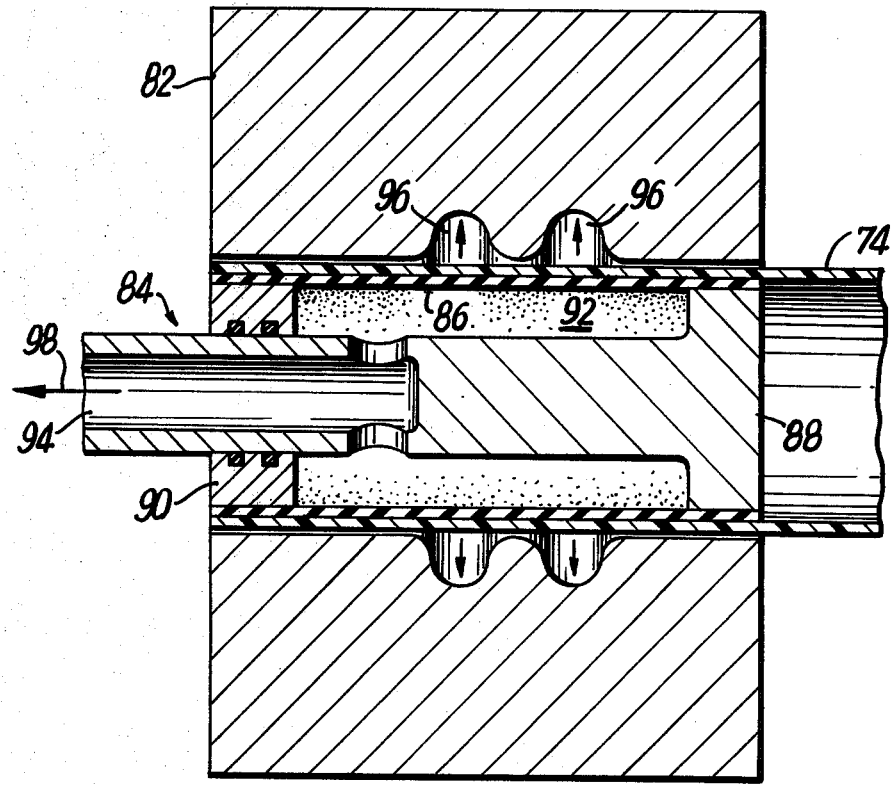
FIG. 4 is a mold for each end of the shaft tube formed as in FIG. 1 to provide desired bellows area, a two bellows form being shown, adjacent each end.

Getting back now to the shaft construction, the reader's attention is focused on FIG. 4 showing a headed mold 82 adapted to be fitted over the end 12 (or 14) of the tube 74, with an internal piston 84 for the forming of the convolutions by either hydraulic or pneumatic pressurization. The internal piston is configured from an expanding bladder 86 and end bulkheads 88 and 90 creating an internal pressure chamber 92. Pressure, which is introduced to the port 94, forms the heated tube into the convolutions in the mold 96 while the center piston 88 moves axially 98 to accomodate tube shortening during forming. During forming the tube wall thickness reduces in a uniform manner to accept the increased circumference at the convolutions. This method of forming utilizes the moldability of either thermoset or thermoplastic matrix systems.

It is to be noted that after forming sleeves 24 are placed over the ends and bonded in place. Then end fittings 18 and 20 are inserted in their ends and holes are drilled for the insertion and squeezing of the rivets to provide a primary load connection for the end flanges to couple the shaft between, for example, a slip yoke from a transmission output shaft and a drive pinion flange of a vehicle differential.

Figure 5:
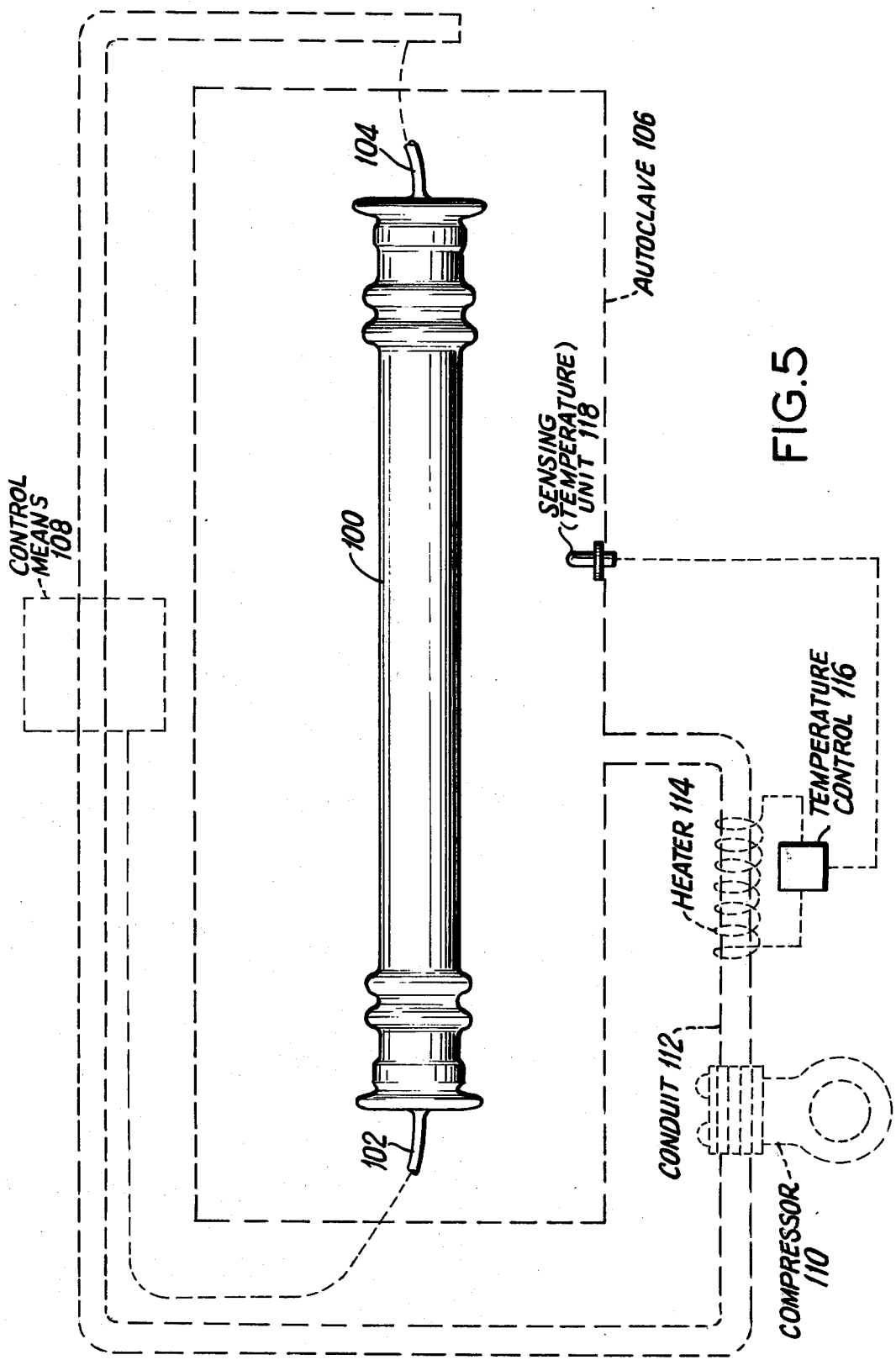
FIG. 5 is a schematic illustration of a form of autoclave cure for the shaft as may be made with a thermosetting resin matrix.

As an alternate approach using either a thermosetting or thermoplastic resin matrix, and the method by which the model was fabricated, a shaft is fabricated by laminating graphite prepeg tape onto a meltable salt mandrel, which includes the convolution shapes. The shaft is then put in a nylon bag 100 which is provided with vacuum ports 102 and 104 as shown in FIG. 5. This is placed in an autoclave 106 shown in phantom which is supplied with 85 psi air at 280° F. while drawing a vacuum in the bag 100 by exhausting air from tubes 102 and 104 leading thereinto under control of means 108 also controlling air inlet of compressor 110 supplying air to conduit 112 within heater coil 114 regulated by temperature control 116 per sensing unit 118 in autoclave 106. In this type of cure, uniform pressure is provided over the surface of the shaft. It should be noted that the salt mandrel will support the shaft walls under pressure during this cure process which lasts approximately eight (8) hours. After curing, the shaft is removed from the bag and postcured, preferably at 375° F. During this postcure, the salt mandrel will melt out and flow to a collection area for reuse.

Having now described an operative structure made by at least two methods for this invention, it is now desired to conclude these Letters Patent by appended claims for the invention as follows

I claim:

1. A compliant composite drive shaft of a symmetrical lamination comprising:
    a tubular length having bellows adjacent each end inwardly of connection means for the shaft to be used between driving and driven devices said tubular length and bellows having:
    an inner layer of a first continuous filament reinforced tape, said inner layer including several of said tapes layed in alternating acute angles to the axis of the shaft;
    an intermediate layer of a second continuous filament reinforced tape including at least one such tape layed along the longitudinal axis of the shaft about said inner layer; and
    an outer layer of said first continuous filament reinforced tape, said outer layer including several of said tapes layed in alternating acute angles to the axis of the shaft, which acute angles are a repeat of that of said tapes of said inner layer providing integrated inner, intermediate and outer layers throughout the tubular length including the bellows adjacent each end that is symmetrical about the shaft axis such that said bellows provide an integrated universal for said shaft within the extremities and adjacent the ends of the drive shaft.

2. The drive shaft of claim 1 wherein said first tape is comprised of continuous fiberglass filaments each parallel to the longitudinal axis of the first tape and to each other within a resin matrix and said second tape is comprised of continuous kevlar filaments each parallel to the longitudinal axis of the second tape and to each other within a resin matrix.

3. The drive shaft of claim 1 wherein said first tape is comprised of continuous fiberglass filaments each parallel to the longitudinal axis of the first tape and to each other within a resin matrix and said second tape is comprised of continuous graphite filaments each parallel to the longitudinal axis of the second tape and to each other within a resin matrix.

4. A composite drive shaft having integral misalignment means, said drive shaft being a symmetrical lamination of a finite length tube with bellows areas within the extremities and adjacent the ends, said lamination comprising:
    inner layers of continuous graphite filaments within a resin matrix providing a reinforced tape, said inner layers being at least two such tapes layed in alternating acute angles to the axis of the shaft from one end to the other between and beyond the spaced bellows areas;
    an intermediate layer of continuous graphite filaments within a resin matrix providing another reinforced tape, said intermediate layer being at least one such tape layed along the longitudinal axis of the shaft about said inner layers from one end to the other between and beyond the spaced bellows areas; and
    outer layers of continuous graphite filaments within a resin matrix providing a reinforced tape, said outer layers being at least two such tapes layed in alternating acute angles to the axis of said shaft which acute angles are a repeat of that of said inner layers integrating with said inner and intermediate layers from the ends of said shaft through the bellows areas providing symmetrical construction about the axis of said shaft in integration of a constant velocity universal adjacent but within each end of said shaft.

5. A composite drive shaft of a symmetrical lamination according to claim 1 wherein the alternating angles of the inner and outer layers are ±45° from the axis of the shaft.

6. The composite drive shaft of a symmetrical lamination according to claim 4 wherein the alternating angles of the inner and outer layers are ±45° from the axis of the shaft.

7. The composite drive shaft of claim 5 and further comprising flange means connected to each end of the shaft just beyond the bellows area for operative connection of the drive shaft.

8. The composite drive shaft of claim 5 and further comprising flange means connected to each end of the shaft just beyond the bellows area for operative connection of the drive shaft.

9. The composite drive shaft of claims 1, 4, 5 and 6 wherein the matrix material is a thermosetting resin.

10. The composite drive shaft of claims 1, 4, 5 and 6 wherein the matrix material is a thermoplastic resin.

11. A compliant composite construction for a drive shaft, said composite construction including:
a tubular section with bellows areas adjacent and within the length of said tubular section, said tubular section comprising a lamination of tapes, said tapes being a composite of continuous, unidirectional filaments parallely arranged within a matrix along the axis of the tapes, said lamination being a plurality of bias inner surface layers, an intermediate axial layer and a plurality of bias outer surface layers from end to end through and beyond each bellows area and flange means attached to each end of the tubular section outwardly of the tubular section bellows area to be a connecting means for the drive shaft between a driving and driven means.

12. The structure of claim 11 wherein said bellows area is symmetrical about an axis of the drive shaft.

13. The structure of claim 11 wherein said tapes for said inner and outer surface layers consist of fiberglass filaments and said tapes of said intermediate axial layers consist of kevlar filaments.

14. The structure of claim 11 wherein said tapes for said inner and outer surface layers consist of fiberglass filaments and said tapes of said intermediate axial layers consist of graphite filaments.

* * * * *

UNITED STATES PATENT AND TRADEMARK OFFICE
CERTIFICATE OF CORRECTION

PATENT NO. : 4,173,128
DATED : November 6, 1979
INVENTOR(S) : Nicholas Corvelli

It is certified that error appears in the above-identified patent and that said Letters Patent are hereby corrected as shown below:

Title of the patent should be:

COMPLIANT COMPOSITE DRIVE SHAFT

Signed and Sealed this

Nineteenth Day of February 1980

[SEAL]

Attest:

SIDNEY A. DIAMOND

Attesting Officer — Commissioner of Patents and Trademarks